US006288812B1

(12) United States Patent
Duerksen

(10) Patent No.: US 6,288,812 B1
(45) Date of Patent: Sep. 11, 2001

(54) BIDIRECTIONAL WDM OPTICAL COMMUNICATION NETWORK WITH OPTICAL BRIDGE BETWEEN BIDIRECTIONAL OPTICAL WAVEGUIDES

(75) Inventor: Gary Duerksen, College Park, MD (US)

(73) Assignee: Seneca Networks, Rockville, MD (US)

( * ) Notice: Subject to any disclaimer, the term of this patent is extended or adjusted under 35 U.S.C. 154(b) by 0 days.

(21) Appl. No.: 09/704,566

(22) Filed: Nov. 3, 2000

(51) Int. Cl.$^7$ ........................................... H04J 14/02
(52) U.S. Cl. .......................... 359/127; 359/124; 359/130
(58) Field of Search .................................. 359/124, 127, 359/130, 173

(56) References Cited

U.S. PATENT DOCUMENTS

| 5,548,431 | 8/1996 | Shin et al. | 359/119 |
| 5,647,035 | 7/1997 | Cadeddu et al. | 385/24 |
| 5,712,932 | 1/1998 | Alexander et al. | 385/24 |
| 5,760,934 | 6/1998 | Sutter et al. | 359/119 |
| 5,796,501 | 8/1998 | Sotom et al. | 359/119 |
| 5,812,306 | * 9/1998 | Mizrahi | 359/341 |
| 6,038,044 | 3/2000 | Fee et al. | 359/119 |
| 6,046,833 | 4/2000 | Sharma et al. | 359/119 |
| 6,049,405 | 4/2000 | Oberg | 359/119 |
| 6,061,484 | 5/2000 | Jones et al. | 385/24 |
| 6,067,389 | 5/2000 | Fatehi et al. | 385/17 |
| 6,097,516 | 8/2000 | Almstrom | 359/119 |
| 6,101,012 | 8/2000 | Danagher et al. | 359/127 |
| 6,130,764 | 10/2000 | Taniguchi | 359/119 |
| 6,130,765 | 10/2000 | Gautheron et al. | 359/127 |
| 6,160,660 | * 12/2000 | Aina et al. | 359/341 |

FOREIGN PATENT DOCUMENTS

| 0 959 579 | 11/1999 | (EP) . |
| WO 99/56426 | 11/1999 | (WO) . |

* cited by examiner

Primary Examiner—Leslie Pascal
(74) Attorney, Agent, or Firm—Margaret Burke

(57) ABSTRACT

The present invention relates to a bidirectional optical network including an optical bridge for selectively transferring optical channels between two bidirectional wavelength division multiplexed optical communication systems. Two counter propagating WDM optical signals are carried on each bidirectional waveguide. An optical bridge is interposed between the bidirectional waveguides and includes an optical coupler and channel selector configured to select one or more optical channels from a first WDM optical signal and a second optical coupler and channel selector configured to select one or more optical channels from the counter propagating WDM optical signal. At least one optical path is positioned between the first bidirectional optical waveguide and the second bidirectional optical waveguide which carries at least the selected one or more first optical channels to an optical combiner interposed along the second bidirectional optical waveguide. In this manner, the selected optical channels are combined with either counter propagating WDM signal on the second bidirectional waveguide. Optionally, the optical bridge can be reciprocal such that channels from each of the four WDM optical signals may be transferred between the bidirectional waveguides.

14 Claims, 5 Drawing Sheets

BIDIRECTIONAL WDM OPTICAL COMMUNICATION NETWORK WITH OPTICAL BRIDGE BETWEEN BIDIRECTIONAL OPTICAL WAVEGUIDES

BACKGROUND OF THE INVENTION

1. Field of the Invention:

The invention is directed to optical communication systems in general and, more particularly, to bidirectional optical networks that include two or more independent bidirectional wavelength division multiplexed optical communication systems transporting wavelength division multiplexed optical signals in opposite directions over the same bidirectional waveguiding medium and which include an optical bridge for directing selected optical channels between the independent bidirectional WDM optical systems.

2. Description of the Related Art

As the need for communication signal bandwidth increases, wavelength division multiplexing (WDM) has progressively gained popularity for multiplying the transmission capacity of a single optical fiber. A review of optical networks, including WYDM networks, can be found in Ramaswamni et al., *Optical Networks: A Practical Perspective* (Morgan Kaufinan, ©1998), the disosure of which is incorporated herein by reference. Typically, wavelength division multiplexed optical communication systems have been designed and deployed in the long-haul, interexchange carrier realm. In these long-haul optical systems, a wavelength division multipexed optical communication signal comprising plural optical channels at different wavelengths travels in a singe direction on a single fiber (unidirectional transmission). Because the communication traffic in such systems commonly travels many hundreds of kilometers, the need for add-drop multiplexing of individual channels is infrequent (if at all), occurring at widely-spaced add-drop nodes.

Although the optical infrastructure of long-haul WDM optical systems can accommodate future traffic needs created by increased demand from traditional and multimedia Internet services, this traffic must first be collected and distributed by local networks. Currently, such local networks are structured to carry a single wavelength, time-division multiplexed (TDM) optical signal along a fiber network organized into various ring structures. To route the various components of the TDM signal, numerous electronic add-drop multiplexers are positioned along the fiber network. At each add-drop location, the entire optical signal is converted into an electrical signal; the portions of the electrical signal which are destined for that add-drop point are routed accordingly. The remaining portions of the electrical signal are converted back to a new TDM optical signal and are output through the electronic add-drop multiplexer. Thus, before a user can access the bandwidth-rich WDM long-haul transport networks, he must first pass through the bottleneck of the local networks.

Although unidirectional WDM optical systems are suitable for conventional long-haul interexchange carrier markets, metropolitan (local) communications systems require extensive routing and switching of traffic among various nodes positioned within interconnecting optical fiber rings. Consequently, smaller metropolitan markets require considerably more extensive add-drop multiplexing in order to successfully implement wavelength division multiplexing in their short-range systems. Further, in order to maximize the effectiveness of wavelength division multiplexing in these local areas, it would be useful to implement bidirectional WDM optical systems, e.g., to enhance network design flexibility. In a bidirectional WDM system counter-propagating WDM optical signals, each of which carry a number of optical channels, are carried on the same waveguiding medium, such as a single optical fiber. Implementation of a bidirectional system requires several considerations not present in the conventional unidirectional optical systems. Add-drop multiplexing in a bidirectional optical environment becomes considerably more complex since optical channels must be selected from each of the counter-propagating WDM optical signals. In addition to the difficulties posed by add-drop multiplexing channels from two counter-propagating WDM optical signals, there must also be techniques for directing channels from one independent bidirectional WDM optical system to another. For example, in a local metropolitan network, it would be desirable to optically transfer traffic among adjacent bidirectional rings.

Several bidirectional multiplexing designs have been proposed; however, none of these include techniques for optically routing traffic between independent bidirectional WDM optical systems. In U.S. Pat. No. 5,909,295, optical circulators are used to separate the counter-propagating optical signals that are further filtered down to individual channel wavelengths; this design appears to be predominantly directed to an end node in a WDM optical system. In many embodiments, expensive four-port (or higher) optical circulators must be used. Although optical channels are separated, there is no teaching or suggestion of signal recombination such that a bidirectional optical signal continues to propagate along a bidirectional transmission waveguide.

U.S. Pat. No. 6,130,765 a bidirectional add-drop multiplexer is described. The apparatus comprises two three-port main circulators inserted into a line fiber; the third port of each circulator is connected by auxiliary optical fibers to auxiliary circulators. While this patent depicts channel routing in a single bidirectional line fiber, it does not teach or suggest an optical device capable of routing optical channel traffic between two independent bidirectional line fibers belonging to independent bidirectional WDM optical systems.

Thus, there is a need in the art for a bidirectional device to permit optical channel routing between independent bidirectional optical communication systems. Such devices would permit effective implementation of bidirectional wavelength division multiplexing in local, metropolitan markets requiring high volumes of signal re-routing and allow creation of flexible network topologies.

SUMMARY OF THE INVENTION

The present invention relates to a bidirectional optical network including an optical bridge for selectively transferring optical channels between two independent bidirectional wavelength division multiplexed optical communication systems. The optical network includes a first bidirectional optical waveguide carrying a first bidirectional wavelength division multiplexed optical communication signal which includes a first wavelength division multiplexed optical communication signal including plural optical channels propagating in a first direction and a second wavelength division multiplexed optical communication signal including plural optical channels propagating in a second direction. Similarly, the bidirectional optical network includes a second bidirectional optical waveguide carrying a second bidirectional wavelength division multiplexed optical communication signal, including a third wavelength division multiplexed optical communication signal having plural optical channels propagating in a third direction and a fourth wavelength division multiplexed optical communication signal having plural optical channels propagating in a fourth direction.

An optical bridge is interposed between the first bidirectional optical waveguide and the second bidirectional optical waveguide. The optical bridge includes an optical coupler and channel selector configured to select one or more optical channels from the first wavelength division multiplexed optical communication signal. A second optical coupler and channel selector selects one or more optical channels from the second wavelength division multiplexed optical communication signal. At least one optical path is positioned between the first bidirectional optical waveguide and the second bidirectional optical waveguide which carries at least the selected one or more first optical channels to an optical combiner optically communicating with the second bidirectional optical waveguide. In this manner, the selected one or more first optical channels are combined with either the third wavelength division multiplexed optical communication signal or the fourth wavelength division multiplexed optical communication signal on the second bidirectional optical waveguide. Optionally, the optical bridge can be reciprocal such that channels from each of the four WDM optical signals may be transferred between the bidirectional waveguides.

Figure 1:
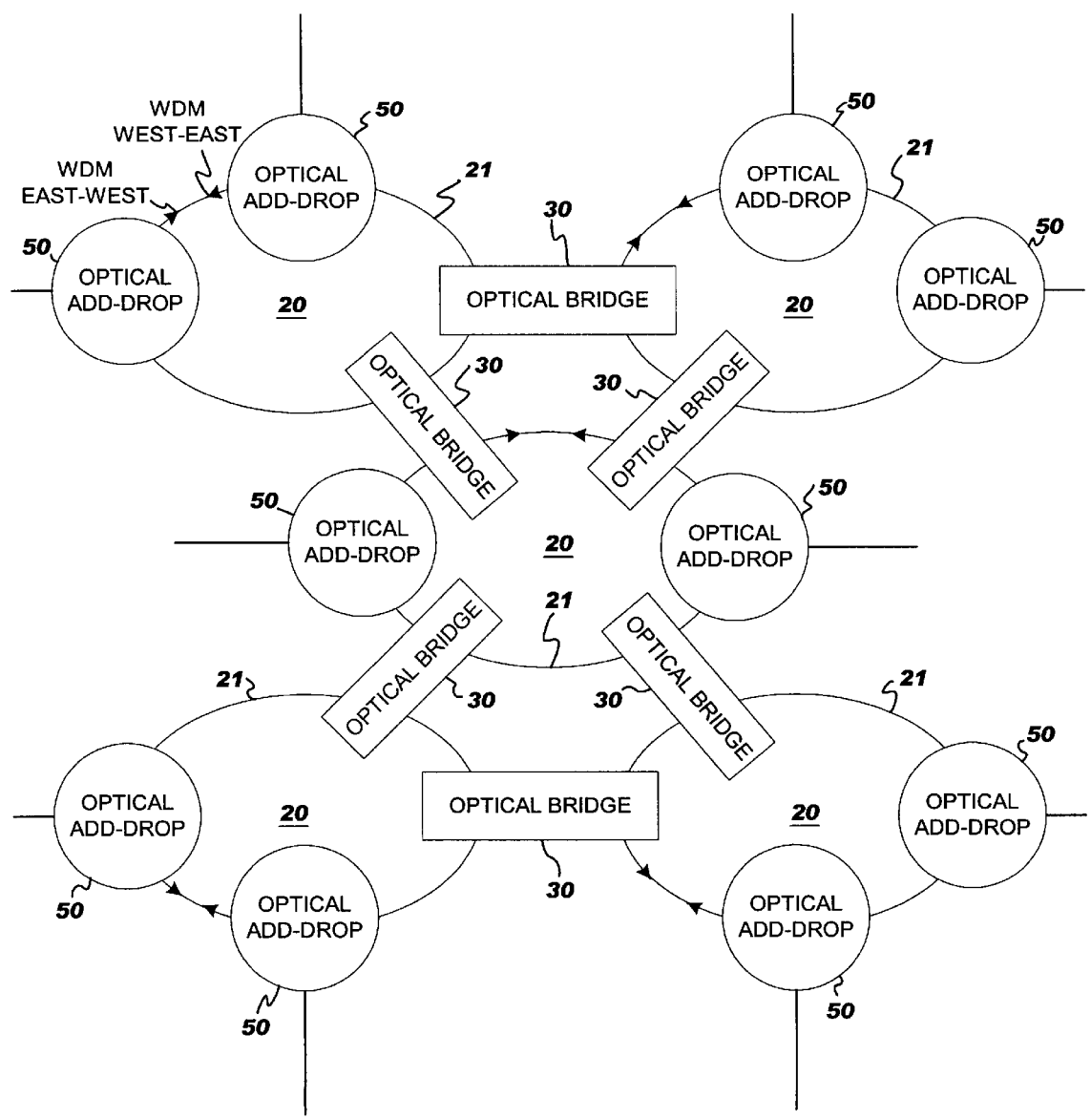
FIG. 1 is a schematic illustration of a bidirectional optical network employing bidirectional optical rings and optical bridges which permit optical communication between the rings.

DETAILED DESCRIPTION:

Turning to the drawings in detail in which like numerals indicate the same or similar elements in each of the several views, FIG. I depicts a bidirectional optical network 10 employing bidirectional optical rings 20 and optical bridges 30 which permit optical communication between the rings. Each bidirectional ring includes at least one bidirectional optical transmission waveguide 21. As discussed in further detail below, bidirectional optical transmission waveguide 21 is configured to carry two counter-propagating wavelength division multiplexed optical communication signals, each WDM signal comprised of plural optical channels at different wavelengths. In accordance with traditional industry nomenclature, one of the WDM signals propagating in a first direction is designated the west-east WDM signal while the WDM signal propagating in the opposite direction is designated the east-west WDM signal. The individual optical channels in the west-east WDM optical signal are denoted by the symbols $\lambda_1, \lambda_2, \lambda_3$ etc., while the individual optical channels in the east-west WDM optical signal are denoted by the symbols $\lambda_a, \lambda_b, \lambda_c$, etc. for clarity of presentation. Although not shown in FIG. 1, it is common for ring networks to include at least two alternate optical paths- a "work" path and a "protect" path. Only one path is depicted in FIG. 1 although it is understood that at least an additional path may be provided in each optical ring 20. Further, although the ring network of FIG. 1 appears symmetrical, it is understood by those in the art that such ring networks are typically not symmetrical as the position and size of each optical ring is dictated by the traffic needs of the geographical area which it serves.

As used herein, the expression "wavelength division multiplexed" or "WDM" refers to any optical system or signal composed of plural optical channels having different wavelengths, regardless of the number of channels in the system or signal. As such, the term "wavelength division multiplexing" or "WDM" encompasses all categories of WDM such as DWDM (dense wavelength division multiplexing) and CWDM (coarse wavelength division multiplexing).

Optical bridges 30 permit optical communication between two bidirectional waveguides. As used herein, the expression "optical communication" designates an optical path between two elements. The optical path may be a direct path or it may route through intermediate optical devices (e.g., optical isolators, optical circulators, optical couplers, optical filters, optical amplifiers, etc.). Through the use of optical bridges 30, one or more channels from at least one of the counter-propagating WDM optical signals on a first bidirectional waveguide may be selected for transfer to another bidirectional waveguide, as will be explained below. It is noted that, although optical network 10 of FIG. 1 is depicted as an optical ring network, the optical bridges of the present invention may be employed between any two bidirectional waveguides, each of which carries two counter-propagating WDM optical signals including plural channels. Examples of other network topologies in which the optical bridges of the present invention may be employed include mesh networks, point-to-point networks, subtended ring networks, or any other network topology which includes at least two bidirectional waveguides.

In addition to optical bridges 30, each bidirectional waveguide 21 may be provided with bidirectional add-drop multiplexers 50 which do not necessarily add or drop optical channels to an adjacent ring. An exemplary bidirectional add-drop multiplexer for use with a bidirectional WDM optical system carry two counter-propagating WDM optical signals is depicted in assignee's copending U.S. patent application ser. No. 09/677,764, filed Oct. 3, 2000, the disclosure of which is incorporated by reference herein. It is understood that channels added to or dropped by the optical add-drop multiplexers 50 may originate from or route to any local or remote location. Therefore, an optical channel dropped from optical add-drop multiplexer 50 at the top of the upper left ring 20 could be routed to the optical add-drop multiplexer 50 at the bottom of the lower right ring 20. In this way, the optical add-drop multiplexers may be used to bypass adjacent rings for which traffic from a first ring is not intended and route that traffic directly to the destination ring.

Figure 2:
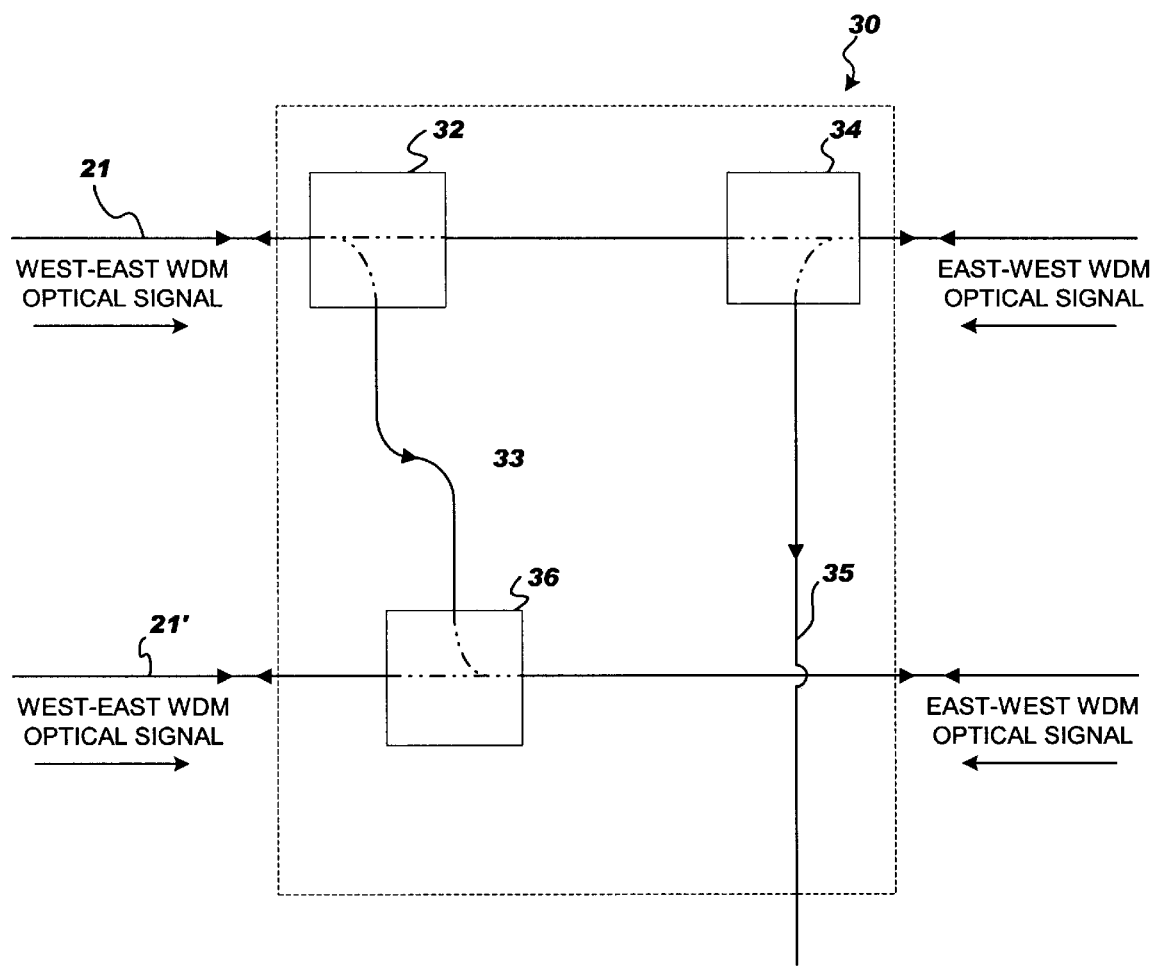
FIG. 2 is a schematic functional representation of an optical bridge for enabling optical communication between two bidirectional optical waveguides.

Turning to FIG. 2, the overall function of optical bridge 30 is schematically depicted to give a conceptual overview of the optical bridge. Element 32 functionally depicts a first optical coupling and channel selecting means configured to select one or more first optical channels from the west-east wavelength division multiplexed optical communication signal propagating from left to right along bidirectional optical waveguide 21. The selected one or more optical channels are routed onto output optical path 33, positioned between the first bidirectional optical waveguide 21 and the second bidirectional optical waveguide 21'.

Optical path 33 communicates with optical combiner 36 which optically communicates with the second bidirectional optical waveguide 21' for combining the selected one or more first optical channels with either the east-west or west-east WDM optical signal propagating along waveguide 21'.

A second optical coupling and channel selecting means 34 is configured to select one or more second optical channels from the east-west WDM optical communication signal propagating along bidirectional waveguide 21. Selected channels are routed onto optical path 35. As shown in FIG. 2, the channels placed onto optical path may be routed such that they are not placed onto the second bidirectional optical waveguide 21'. In this manner, these channels may be routed to a terminating receiver or they may be routed to another optical bridge 30 or an optical add-drop multiplexer 50 for placement onto another optical waveguide. Alternatively, the selected optical channels may be combined onto optical path 33 and placed onto bidirectional waveguide 21' (not shown in this FIG.). In another alternative, optical path 35 may route to another optical combiner interposed along bidirectional waveguide 21' for placement of the selected channels onto that waveguide.

In a further embodiment, one or more optical channels placed onto optical path 35 may be directed to one or more customers for lambda ($\lambda$) provisioning. By lambda provisioning, it is meant that a customer may lease one or more optical channels (lambdas) for exclusive use by that customer. In such an arrangement, the optical network provider directs the customer's lambda to desired locations on its optical network based upon customer needs. Similarly, a lambda generated from customer data is routed on the optical network as directed by the customer. For example, a lambda-provisioned customer may use an optical channel to route information between plural customer premises for direct and secure communication among diverse customer sites.

Figure 3:
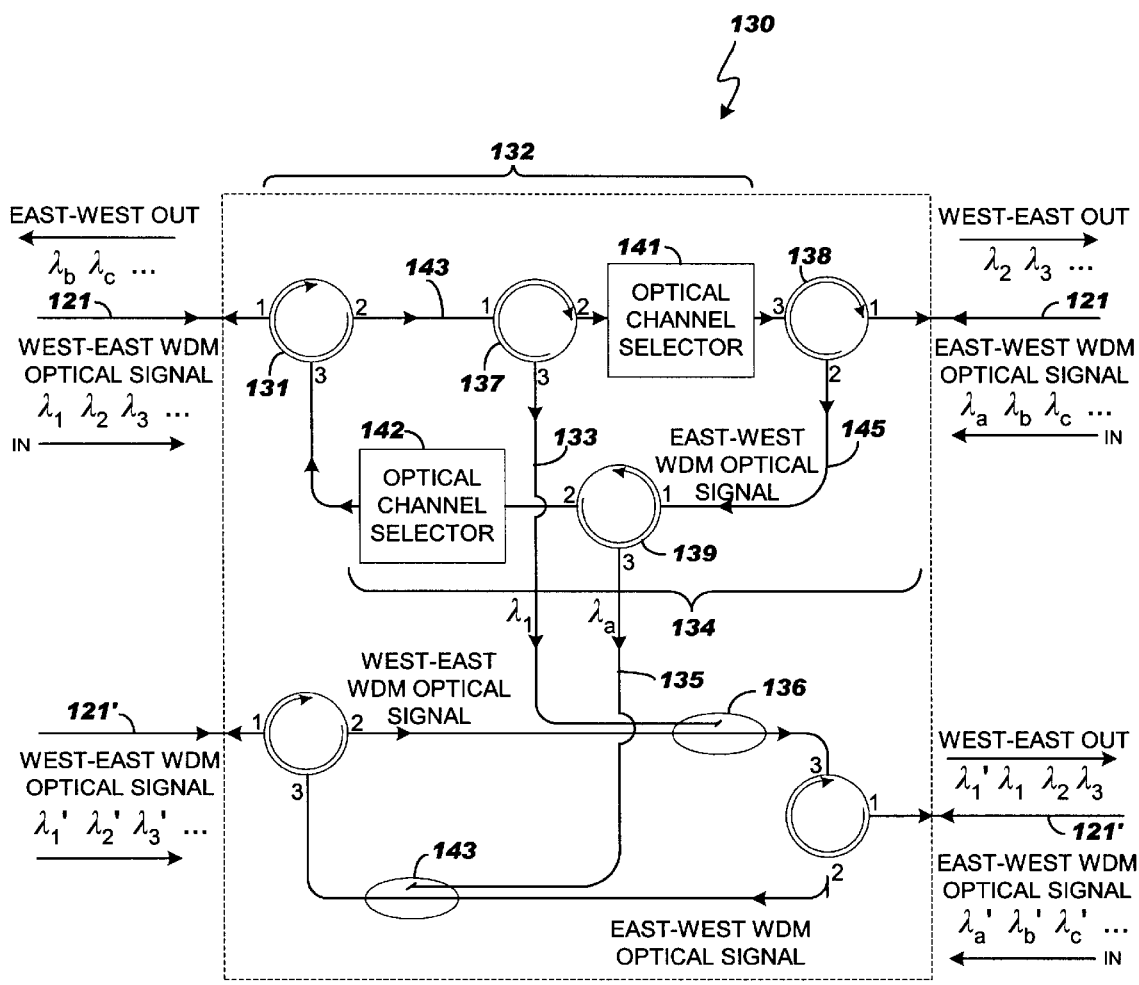
FIG. 3 is an optical bridge according one embodiment of the present invention.

Turning to FIG. 3, an optical bridge 130 is depicted according to one embodiment of the present invention. In optical bridge 130, optical coupling and selecting means includes two three-port optical circulators, 131 and 137, and optical channel selector 141. In each of these three-port circulators, optical signals entering the first optical port of the circulator are Faraday rotated to exit the second optical port. Similarly, optical signals entering the second optical port exit through the third optical port while signals entering the third optical port exit through the first optical port. The operation of optical circulators is discussed in Optical Networks: A Practical Perspective, incorporated by reference above. In the present invention, any device which is capable of transferring optical signals among plural input and output ports may be used for elements 131 and 137 in the optical bridge. Three-port optical circulators such as those depicted in FIG. 1 are commercially available from a variety of sources including E-Tek, JDS Uniphase, AOC Technologies, and Tokin and will not be further described here.

In FIG. 3, the west-east WDM optical signal enters optical port 1 of circulator 131 where it is output onto an optical path 143. Any medium capable of carrying a WDM optical signal may be used as an optical path; typically an optical fiber or other waveguiding medium is employed. Optical path 143 optically communicates with the first optical port of circulator 137 such that the west-east WDM optical signal enters the first optical port of the second circulator. Upon entering the first port of circulator 137, the west-east optical signals are transferred to output port 2. Output port 2 of circulator 137 optically communicates with optical channel selector 141. Upon encountering optical channel selector 141, one or more channels to be dropped from the west-east WDM signal are selected and routed back towards the second optical port of circulator 137. The remaining optical channels of the west-east WDM signal, i.e., the "through" channels $\lambda_2$, $\lambda_3$ . . . are routed towards first optical port of circulator 138.

Optical channel selector 141 may be selected from any static or reconfigurable optical device which is capable of separating or otherwise routing one or more optical wavelengths from a wavelength division multiplexed optical signal. Such devices include, but are not limited to, Bragg gratings, tunable Bragg gratings, Fabry-Perot filters, acousto-optic tunable filters, multilayer dielectric thin film filters, arrayed waveguide gratings (AWGs) and/or combinations of these devices. Detailed descriptions of such optical selection devices are found in chapter 3 of *Optical Networks: A Practical Perspective*, incorporated by reference above.

In the example depicted in FIG. 3, channel $\lambda_1$ is selected by channel selector 141 and routed back through optical port 2 where it is "dropped" at optical port 3 of circulator 137 onto optical path 133. From there, the selected optical channel travels to optical combiner 136. Optical combiner 136 may be selected from any optical element or group of optical elements which can take one or more selected optical channels from optical path 135 and place them onto the second bidirectional optical waveguide 121'. In FIG. 3. optical combiner 136 is schematically depicted as a fused fiber optical coupler, commercially available from Coming and JDS Uniphase and described in *Optical Networks: A Practical Perspective*, incorporated by reference above. Optical combiner 136 adds the optical channel $\lambda_1$ to the west-east WDM optical signal propagating on the second bidirectional waveguide, 121'.

The optical channels of the west-east WDM optical signal are indicated on the second bidirectional optical waveguide 121' by the symbols $\lambda_1'$, $\lambda_2'$, $\lambda_3'$, etc., to distinguish them from the west-east signals carried on the first bidirectional optical waveguide 121. Note that $\lambda_1$ and $\lambda_1'$ do not necessarily represent the same wavelength; the selected wavelengths for each optical channel will depend upon the overall channel plan for the optical network. However, when $\lambda_1$ and $\lambda_1'$ do represent the same channel wavelength, then $\lambda_1'$ on the second bidirectional waveguide 121' will have been dropped by an earlier optical device to avoid conflict with $\lambda_1$ added by optical combiner 136.

As the remaining optical channels of the west-east WDM signal, i.e., the "through" channels $\lambda_2$, $\lambda_3$ . . . , are routed into the third optical port of circulator 138, they exit optical bridge 130 through the first port of circulator 138 and are returned to bidirectional optical waveguide 121. At the same time, the east-west WDM optical signal simultaneously enters the optical bridge 130 from waveguide 121 through the same circulator port. The east-west WDM optical signal is output onto optical path 145, positioned between optical circulators 138 and 139. The east-west WDM signal enters the first port of circulator 139 where it exits port 2 towards optical channel selector 142. Optical channel selector 142 is substantially similar to channel selector 141 although it is configured to interact with the wavelengths of the east-west WDM signal, rather that the west-east wavelengths of channel selector 141.

As with the west-east WDM optical signal, upon encountering optical selector 142, one or more channels to be dropped from the east-west WDM signal are selected and routed back towards the second optical port of circulator 139. The remaining optical channels of the east-west WDM signal, i.e., the "through" channels $\lambda_b$, $\lambda_c$ . . . , are routed towards the third optical port of circulator 131. In the example depicted in FIG. 3, channel $\lambda_a$ is selected by channel selector 142 and routed back through optical port 2 where it is "dropped" at optical port 3 of circulator 139 onto optical path 135. From optical path 135 the selected optical channel travels to optical combiner 143, which is substantially similar to optical combiner 136, where the channel joins the east-west WDM signal propagating on bidirectional optical waveguide 121': channels $\lambda_a'$, $\lambda_b'$, $\lambda_c'$, etc.

As the through optical channels from first bidirectional optical waveguide 121, $\lambda_b$, $\lambda_c$ . . . etc., are routed towards circulator 131, they enter the third optical port and exit through the first optical port onto bidirectional optical waveguide 121. Simultaneously, the west-east optical channels enter optical bridge 130 through port 1 of circulator 131, as described above.

It is noted that the optical bridge 130 of FIG. 3 permits channels to be routed from the first bidirectional waveguide 121 to the second bidirectional waveguide 121' although channels are not routed from the second bidirectional waveguide to the first bidirectional waveguide. If such reciprocity is desired in the optical network, two optical bridges 130 may be employed. The first optical bridge is positioned in the manner depicted in FIG. 3 while the second optical bridge is positioned so that the optical coupling and channel selecting elements are interposed in the second optical waveguide, 121' instead of along optical waveguide 121 as in FIG. 3.

Figure 4:
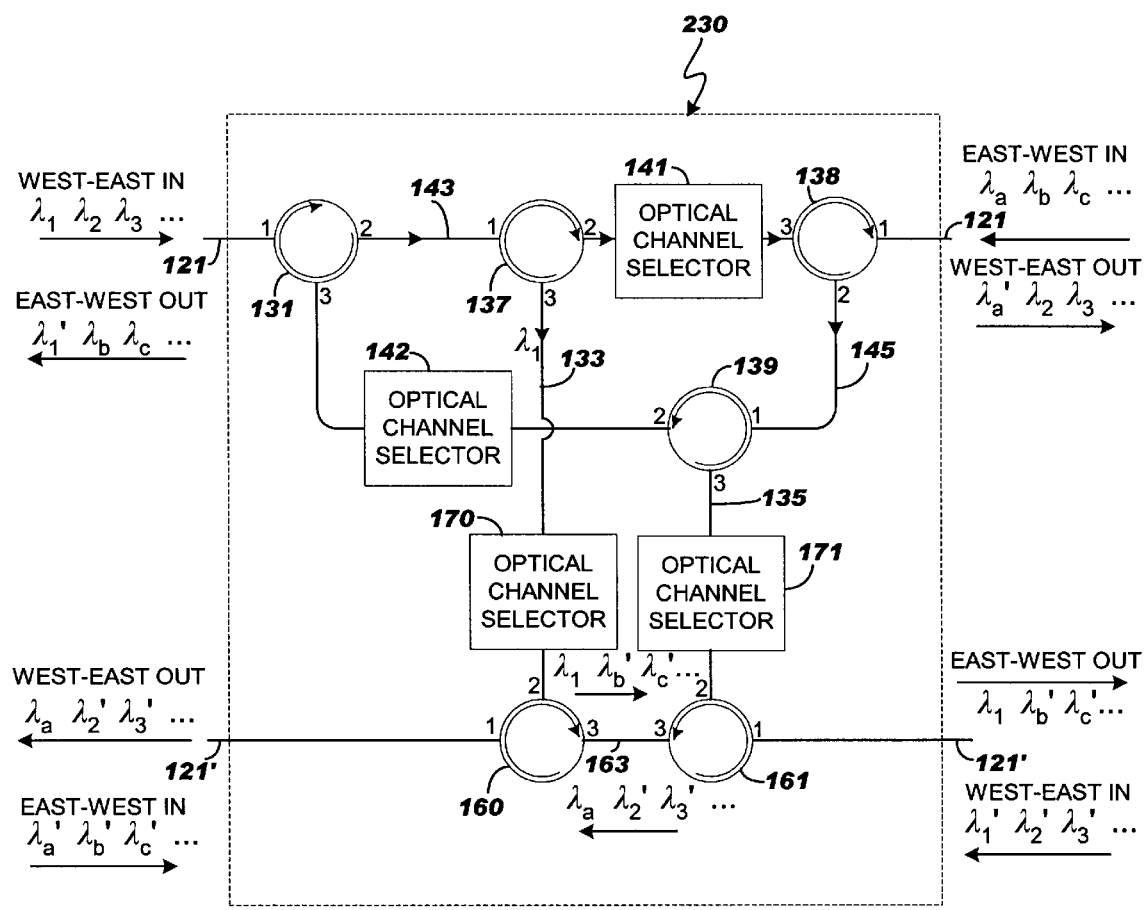
FIG. 4 is an optical bridge according to a further embodiment of the present invention.

Turning to FIG. 4, a further embodiment of an optical bridge, 230, is depicted. In FIG. 4, the upper portion of the optical bridge intersecting bidirectional waveguide 121 is substantially similar to that of FIG. 3 as indicated by the corresponding numerals for elements 131,143, 133,137,141, 138,145, 139, and 142; the operation of this portion of the bridge is discussed in detail above. In the embodiment of FIG. 4, traffic from bidirectional waveguide 121 is directed onto bidirectional waveguide 121' as in the embodiment of FIG. 3; additionally, traffic from bidirectional waveguide 121' may be directed onto bidirectional waveguide 121. To accomplish this task, optical circulators 160 and 161 are interposed along bidirectional waveguide 121' and optical channel reflectors 170 and 171 are respectively interposed along optical paths 133 and 135. As the east-west WDM signal comprising channels $\lambda_a'$, $\lambda_b'$, $\lambda_c'$ . . . enters optical bridge 230 it encounters optical circulator 160, entering through port 1 and exiting through port 2 where it is input to optical channel reflector 170. Optical channel reflector 170 is configured such that the dropped optical channel, $\lambda_1$, is allowed to pass through into port 2 of circulator 160. Channels to be dropped from the east-west WDM optical signal of waveguide 121' (for exemplary purposes, $\lambda_a'$ is indicated as the channel to be routed to the first bidirectional optical waveguide) are also permitted to pass through channel reflector 170; the remaining optical channels are reflected back towards circulator 160 port 2 where they join $\lambda_1$ and are output through port 3 onto optical path 163. From there, the "through" east-west optical channels, $\lambda_b'$, $\lambda_c'$ . . . and the added optical channel $\lambda_1$ enter port 3 of circulator 161 where they exit through port 1 to continue along bidirectional optical waveguide 121'.

Similarly, the west-east WDM signal comprising channels $\lambda_1'$, $\lambda_2'$, $\lambda_3'$ . . . enters optical bridge 230 it encounters optical circulator 161, entering through port 1 and exiting through port 2 where it is input to optical channel reflector 171. Optical channel reflector 171 is configured such that the dropped optical channel, $\lambda_a$, is allowed to pass through into port 2 of circulator 161. Channels to be dropped from the west-east WDM optical signal of waveguide 121' (for exemplary purposes, $\lambda_1'$ is indicated as the channel to be routed to the first bidirectional optical waveguide) are also permitted to pass through channel reflector 171; the remaining optical channels are reflected back towards circulator 161 port 2 where they join a and are output through port 3 onto optical path 163. From there, the "through" west-east optical channels, $\lambda_2'$, $\lambda_3'$ . . . and the added optical channel $\lambda_a$ enter port 3 of circulator 160 where they exit through port 1 to continue along bidirectional optical waveguide 121'.

Optical channel reflectors 170 and 171 may be selected from a number of static and tunable optical filtering components. In one (static) embodiment, the optical channel reflectors include a series of one or more gratings configured to reflect the through channels back to the second port of the respective circulators. Optionally, a notch filter could be created reflecting all the wavelengths other than those to be dropped from path 121' (the "notch"). Alternatively, the optical channel reflectors may include one or more tunable Bragg gratings such that the optical channel reflectors are dynamically reconfigurable.

Figure 5:
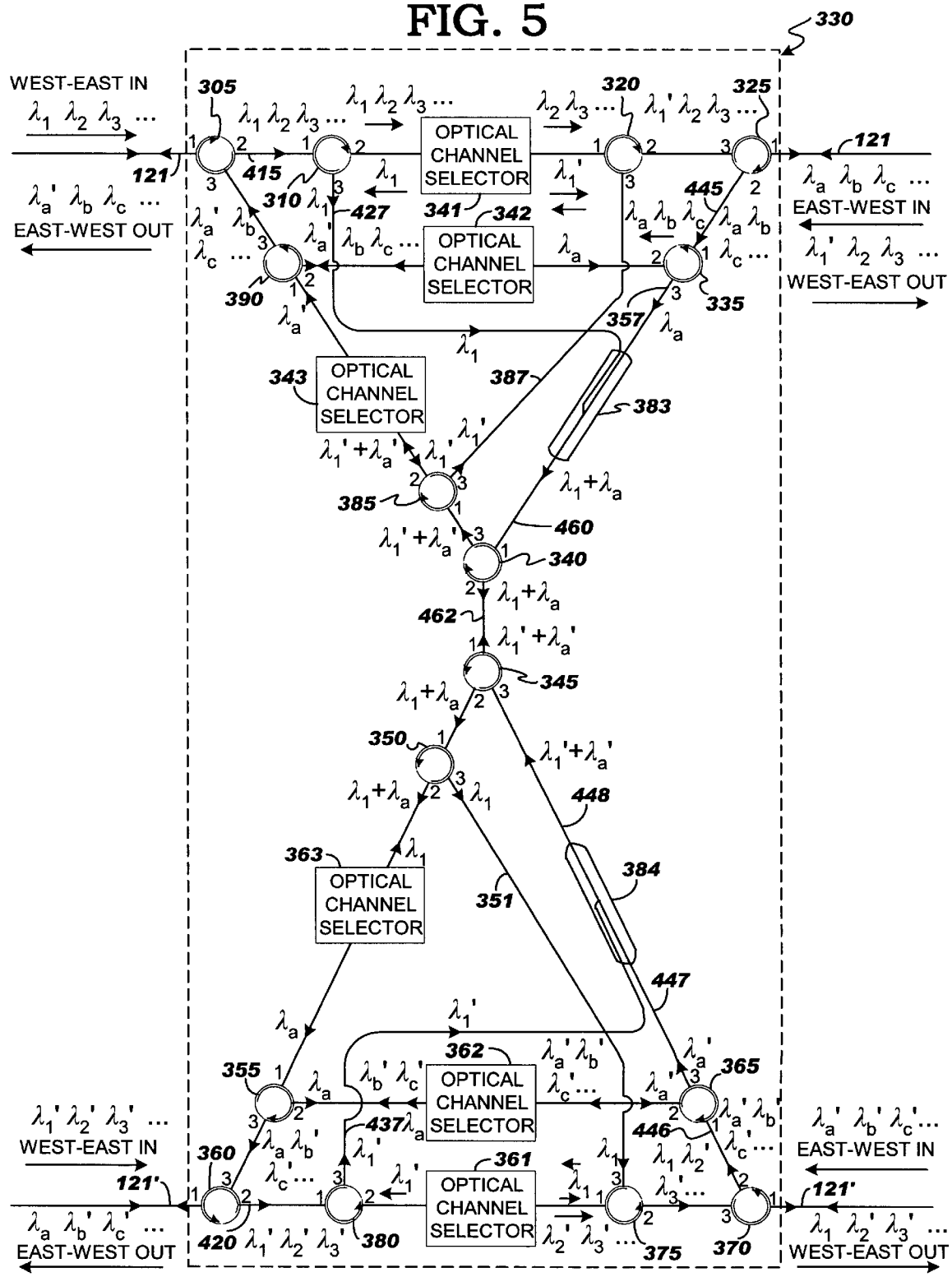
FIG. 5 is an optical bridge according to a further embodiment of the present invention.

FIG. 5 depicts an optical bridge 330 according to a further embodiment of the present invention. Optical bridge 330 allows optical channels traveling in each direction of bidirectional waveguide 121 to be transferred to bidirectional waveguide 121' and vice-versa. Optical bridge 330 includes three-port optical circulators 305, 310, 320, 325, 335, 340, 345, 350, 355, 360, 365, 370, 375, 380, 385, and 390, the operation of which has been described above. The west-east WDM optical signal propagating on bidirectional waveguide 121 enters optical port 1 of circulator 305 where it is output to optical path 415. The optical path may be a direct path or it may route through intermediate optical devices (e.g., optical isolators, additional optical circulators, filters, amplifiers, etc.). Upon entering the first port of circulator 310, the west-east optical signals are transferred to output port 2. Output port 2 of circulator 20 optically communicates with optical channel selector 341. Upon encountering optical selector 341, one or more channels to be dropped from the west-east WDM signal are selected and routed back towards the second optical port of circulator 310. The remaining optical channels of the west-east WDM signal, i.e., the "through" channels $\lambda_2$, $\lambda_3$ . . . , are routed towards first optical port of circulator 320. In the example depicted in FIG. 5, channel $\lambda_1$ is selected by channel selector 341 and routed back through optical port 2 where it is "dropped" at optical port 3 of circulator 310 onto optical path 427. From there, the selected optical channel travels toward optical combiner 383, which may be a fused fiber coupler or any of the devices discussed in connection with optical combiners 136 and 143 of FIG. 3.

The east-west WDM optical signal of bidirectional waveguide 121 enters the optical bridge 330 through port 1 of circulator 325. The east-west WDM optical signal is output onto optical path 445, positioned between optical circulators 325 and 335. The east-west WDM signal enters the first port of circulator 335 where it exits port 2 towards optical channel selector 342. As with the west-east WDM optical signal, upon encountering optical selector 342, one or more channels to be dropped from the east-west WDM signal are selected and routed back towards the second optical port of circulator 335. The remaining optical channels of the east-west WDM signal, i.e., the "through"

channels $\lambda_b$, $\lambda_c$ . . . , are routed towards second optical port of circulator 390. In the example depicted in FIG. 5, channel $\lambda_a$ is selected by channel selector 342 and routed back through optical port 2 where it is "dropped" at optical port 3 of circulator 335 onto optical path 357. Optical path 357 communicates with optical coupler 383 such that the dropped channels from each direction, $\lambda_1$ and $\lambda_a$, are combined and placed onto output path 460. From there, they enter port 1 of circulator 340 and are output through port 2 onto optical path 462.

Similarly, the west-east WDM optical signal propagating on bidirectional waveguide 121' enters optical port 1 of circulator 360 where it is output through port 2 to optical path 420. Upon entering the first port of circulator 380, the west-east optical signals are transferred to output port 2. Output port 2 of circulator 380 optically communicates with optical channel selector 361. Upon encountering optical selector 361, one or more channels to be dropped from the west-east WDM signal are selected and routed back towards the second optical port of circulator 380. The remaining optical channels of the west-east WDM signal, i.e., the "through" channels $\lambda_2'$, $\lambda_3'$ . . . , are routed towards first optical port of circulator 375. In the example depicted in FIG. 5, channel $\lambda_1'$. is selected by channel selector 361 and routed back through optical port 2 where it is "dropped" at optical port 3 of circulator 380 onto optical path 437. From there, the selected optical channel travels toward optical combiner 384.

The east-west WDM optical signal of bidirectional waveguide 121' enters the optical bridge 330 through port 1 of circulator 370. The east-west WDM optical signal is output through port 2 onto optical path 446, positioned between optical circulators 370 and 365. The east-west WDM signal enters the first port of circulator 365 where it exits through port 2 towards optical channel selector 362. Upon encountering optical selector 342, one or more channels to be dropped from the east-west WDM signal are selected and routed back towards the second optical port of circulator 365. The remaining optical channels of the east-west WDM signal, i.e., the "through" channels $\lambda_b'$, $\lambda_c'$ . . . , are routed towards the second optical port of circulator 355. In the example depicted in FIG. 5, channel $\lambda_a'$ is selected by channel selector 362 and routed back through optical port 2 where it is "dropped" at optical port 3 of circulator 365 onto optical path 447. Optical path 447 communicates with optical coupler 384 such that the dropped channels from each direction, $\lambda_1'$ and $\lambda_a'$, are combined and placed onto output path 448. From there, they enter port 3 of circulator 345 and are output through port 1 onto optical path 462.

At this point, the dropped optical channels from the first bidirectional waveguide 121, $\lambda_1$ and $\lambda_a$, must be combined with the optical traffic on the second bidirectional waveguide 121'; similarly, the dropped optical channels from second bidirectional waveguide 121', $\lambda_1'$ and $\lambda_a'$, must be combined with the optical traffic on the first bidirectional optical waveguide 121. The paths taken by each respective set of combined signals is described below.

From optical path 462, $\lambda_1$ and $\lambda_a$ enter port 1 of circulator 345 and are output through port 2 where they are routed to input port 1 of optical circulator 350. As the signals exit through port 2 of circulator 350, they enter optical channel selector 363. Optical channel selector 363 is substantially similar to optical channel 341; consequently, $\lambda_1$ is reflected back toward circulator 350 and output through port 3 onto optical path 351. Optical path 351 optically communicates with optical circulator 375 port 3 which outputs $\lambda_1$ through port 1 and towards optical channel selector 361. Optical channel selector 361 is substantially similar to optical channel selectors 363 and 341; thus $\lambda_1$ is reflected back toward port 1 of circulator 375 where it joins west-east through channels $\lambda_2'$, $\lambda_3'$ . . . and is output through port 2 which optically communicates with port 2 of entrance/exit circulator 370. The through channels and added optical channels exit optical bridge 330 through port 1 of circulator 370 as the east-west WDM signal enters through the same port.

Meanwhile, at optical channel selector 363, $\lambda_a$ passes through the channel selector and enters port 1 of circulator 355 exiting through port 2 and encountering optical channel selector 362. Optical channel selector 362 is substantially similar to optical channel selector 342, therefore $\lambda_a$ is reflected back towards port 2 of circulator 355 along with "through" channels $\lambda_b'$, $\lambda_c'$ . . . (which have passed through optical channel selector 362, as discussed above) and is output through port 3 which optically communicates with port 3 of entrance/exit circulator 360. The through optical channels, "through" channels $\lambda_b'$, $\lambda_c'$ . . . , and the added channel, $\lambda_a$, enter circulator 360 through port 3 and exit optical bridge 330 through port 1 to bidirectional optical waveguide 121'.

A similar progression occurs with optical channels $\lambda_1'$ and $\lambda_a'$ as they are respectively combined with the west-east and cast-west WDM optical signals propagating on bidirectional optical waveguide 121. From optical path 462, $\lambda_1'$ and $\lambda_a'$ enter port 2 of circulator 340 and are output through port 3 where they are routed to input port 1 of optical circulator 385. As the signals exit through port 2 of circulator 385, they enter optical channel selector 343. Optical channel selector 363 is substantially similar to optical channel 341; consequently, $\lambda_1'$ is reflected back toward circulator 385 and output through port 3 onto optical path 387. Optical path 387 optically communicates with optical circulator 320 port 3 which outputs $\lambda_1'$ through port 2 and towards optical channel selector 341. Optical channel selector 341 is substantially similar to optical channel selectors 343, 361, and 363; thus $\lambda_1'$ is reflected back toward port 2 of circulator 320 where it joins west-east through channels $\lambda_2$, $\lambda_3$ . . . and is output through circulator 320 port 3 which optically communicates with port 3 of entrance/exit circulator 325. The through channels and added optical channels exit optical bridge 330 through port 1 of circulator 325 as the east-west WDM signal enters through the same port.

Meanwhile, at optical channel selector 343, $\lambda_a'$ passes through the channel selector and enters port 1 of circulator 390 exiting through port 2 and encountering optical channel selector 342. Optical channel selector 342 is substantially similar to optical channel selector 362, therefore $\lambda_a'$ is reflected back towards port 2 of circulator 390 along with "through" channels $\lambda_b$, $\lambda_c$ . . . (which have passed through optical channel selector 342, as discussed above) and are output through port 3 which optically communicates with port 3 of entrance/exit circulator 305. The through optical channels $\lambda b$, $\lambda_c$ . . . and the added channel, $\lambda_a'$, enter circulator 305 through port 3 and exit optical bridge 330 through port 1 to bidirectional optical waveguide 121.

While FIG. 5 has been shown and described with a single optical channel from each of the four WDM optical signals being transferred through the bridge, this depiction was solely for ease of presentation. It is understood that the optical channel selectors of FIG. 5 can select an arbitrary number of optical channels from the WDM optical signals. Further, as recognized by those of ordinary skill in the optical communication systems art, optical circulators 320, 355, 375, and 390 can be easily replaced by a standard optical coupler/combiner (e.g., of the type used for combiners 383 and 384) in which case the added optical channels would not interact with optical channel selectors 341, 362, 361, and 342, respectively, but would be directly added to the through optical channels.

The optical channel selectors 341, 342, 343, 361, 362, and 363 may be selected from any static or reconfigurable optical device which is capable of separating or otherwise routing one or more optical wavelengths from a wavelength division multiplexed optical signal, and may comprise one or more of the elements discussed in connection with FIG. 3, above.

Because the bidirectional optical waveguides 121 and 121' must be interrupted at many locations in a local network to interpose optical bridges or bidirectional add-drop multiplexers, it may be advantageous to include optical amplification in the optical bridge to minimize the need to further insert optical amplifiers at other locations along the bidirectional transmission lines. For the configuration in FIG. 5, optical amplifiers may be optionally inserted on the optical path between circulators 305 and 390, between circulators 320 and 325, between coupler 383 and circulator 340, between circulator 370 and 375, between circulator 355 and 360, and/or between optical coupler 384 and circulator 345 or at any other location in which signal amplification is desirable. Optical amplifiers may be selected from any device capable of optically amplifying an optical signal without the need for conversion to an electrical signal. Such devices include, but are not limited to, doped fiber amplifiers (e.g., erbium-doped fiber amplifiers), semiconductor optical amplifiers, Raman optical amplifiers, etc. Particulars of various optical amplifiers may be found in Chapter 3 of *Optical Networks: A Practical Perspective*, incorporated by reference above.

Depending upon the selected channel plan for the overall optical network, optical amplifiers may be customized for optimal gain flatness in the wavelength region of the selected channels. For example, if the west-east WDM signal includes only optical channels within the C-band (nominally defined as wavelengths from approximately 1530–1565 nm), then a selected optical amplifier would be optimized to provide as flat a gain profile as possible across those wavelengths. Conversely, if the east-west WDM signal includes only optical channels within the L band (nominally defined as wavelengths from approximately 1565-1610 nm), then the selected optical amplifier would be optimized to provide an adequately flat gain profile across those wavelengths.

Alternatively, the west-east channels may be selected from wavelengths across the entire wavelength spectrum to provide maximum interchannel spacing distance (and minimize potential cross talk. In such an embodiment, the east-west channel wavelengths would alternate with the west-east channel wavelengths in an interleaved manner (e.g., west-east channel wavelengths of 1528, 1532, 1536, 1540, etc. and east-west channel wavelengths of 1530, 1534, 1538, 1542, etc.). In this channel plan, amplifiers with reasonably flat gain profiles, such as semiconductor optical amplifiers, may be selected. In either case, the west-east and east-west channels plans will likely be dictated by overall system considerations, such as the network topology in which the optical bridges are deployed.

Various dispersion compensation techniques may also be employed in the optical bridges of the present invention. For example, additional circulators having an output path including a chirped grating and/or dispersion compensating fiber may be placed in communication with the optical bridge to compensate for transmission-induced signal dispersion. Alternatively, lengths of dispersion compensating fiber may be spliced in along optical paths within the optical bridge.

While the above invention has been described with reference to the particular exemplary embodiments, many modifications and functionally equivalent elements may be substituted without departing from the spirit and contributions of the present invention, namely, the provision of an optical bridge between two bidirectional optical waveguides each carrying counter propagating WDM optical signals. Accordingly, modifications and functionally equivalent elements such as those suggested above, but not limited thereto, are considered to be within the scope of the following claims.

What is claimed is:

1. A bidirectional optical network including an optical bridge for selectively transferring optical channels from one bidirectional wavelength division multiplexed optical waveguide to another bidirectional wavelength division multiplexed optical waveguide comprising:

a first bidirectional optical waveguide carrying a first bidirectional wavelength division multiplexed optical communication signal, the first bidirectional wavelength division multiplexed optical communication signal comprising a first wavelength division multiplexed optical communication signal including a plurality of first optical channels propagating in a first direction and further comprising a second wavelength division multiplexed optical communication signal comprising a plurality of second optical channels propagating in a second direction;

a second bidirectional optical waveguide carrying a second bidirectional wavelength division multiplexed optical communication signal, the second bidirectional wavelength division multiplexed optical communication signal comprising a third wavelength division multiplexed optical communication signal including a plurality of third optical channels propagating in a third direction and further comprising a fourth wavelength division multiplexed optical communication signal comprising a plurality of fourth optical channels propagating in a fourth direction;

an optical bridge interposed between the first bidirectional optical waveguide and the second bidirectional optical waveguide, the optical bridge comprising:

first optical coupling means and first channel selecting means configured to select one or more first optical channels from the first wavelength division multiplexed optical communication signal;

second optical coupling means and second channel selecting means configured to select one or more second optical channels from the second wavelength division multiplexed optical communication signal;

at least one optical path positioned between the first bidirectional optical waveguide and the second bidirectional optical waveguide;

means for placing at least the selected one or more first optical channels onto the optical path;

combining means optically communicating with the second bidirectional optical waveguide for combining the selected one or more first optical channels with either the third wavelength division multiplexed optical communication signal propagating in the third direction or the fourth wavelength division multiplexed optical communication signal propagating in the fourth direction on the second bidirectional optical waveguide.

2. A bidirectional optical network as recited in claim 1 wherein the first coupling means comprises one or more optical circulators.

3. A bidirectional optical network as recited in claim 1 wherein the second coupling means comprises one or more optical circulators.

4. A bidirectional optical network as recited in claim 1 wherein the combining means comprises one or more fiber couplers.

5. A bidirectional optical network as recited in claim 1 wherein the combining means comprises one or more optical circulators.

6. A bidirectional optical network as recited in claim 1 wherein the first and second channel selecting means each include one or more Bragg gratings.

7. A bidirectional optical network including an optical bridge for selectively transferring optical channels between two bidirectional wavelength division multiplexed optical communication waveguides comprising:
- a first bidirectional optical waveguide carrying a first bidirectional wavelength division multiplexed optical communication signal, the first bidirectional wavelength division multiplexed optical communication signal comprising a first wavelength division multiplexed optical communication signal including a plurality of first optical channels propagating in a first direction and further comprising a second wavelength division multiplexed optical communication signal comprising a plurality of second optical channels propagating in a second direction;
- a second bidirectional optical waveguide carrying a second bidirectional wavelength division multiplexed optical communication signal, the second bidirectional wavelength division multiplexed optical communication signal comprising a third wavelength division multiplexed optical communication signal including a plurality of third optical channels propagating in a third direction and further comprising a fourth wavelength division multiplexed optical communication signal comprising a plurality of fourth optical channels propagating in a fourth direction;
- an optical bridge interposed between the first bidirectional optical waveguide and the second bidirectional optical waveguide, the optical bridge comprising:
  - first optical coupling means and first channel selecting means configured to select one or more first optical channels from the first wavelength division multiplexed optical communication signal;
  - second optical coupling means and second channel selecting means configured to select one or more second optical channels from the second wavelength division multiplexed optical communication signal;
  - at least a first optical path positioned between the first bidirectional optical waveguide and the second bidirectional optical waveguide;
  - means for placing the selected one or more first optical channels and the selected one or more second optical channels onto the first optical path;
  - third optical coupling means and third channel selecting means configured to select one or more third optical channels from the third wavelength division multiplexed optical communication signal;
  - fourth optical coupling means and fourth channel selecting means configured to select one or more fourth optical channels from the fourth wavelength division multiplexed optical communication signal;
  - means for placing the selected one or more third optical channels and the selected one or more fourth optical channels onto the first optical path;
  - means for combining the selected one or more first optical channels with the third wavelength division multiplexed optical communication signal;
  - means for combining the selected one or more second optical channels with the fourth wavelength division multiplexed optical communication signal;
  - means for combining the selected one or more third optical channels with the first wavelength division multiplexed optical communication signal;
  - means for combining the selected one or more fourth optical channels with the second wavelength division multiplexed optical communication signal.

8. A bidirectional optical network as recited in claim 7 wherein the first coupling means comprises one or more optical circulators.

9. A bidirectional optical network as recited in claim 7 wherein the second coupling means comprises one or more optical circulators.

10. A bidirectional optical network as recited in claim 7 wherein the third coupling means comprises one or more optical circulators.

11. A bidirectional optical network as recited in claim 7 wherein the fourth coupling means comprises one or more optical circulators.

12. A bidirectional optical network as recited in claim 7 wherein the first, second, third, and fourth channel selecting means each include one or more Bragg gratings.

13. A bidirectional optical network as recited in claim 7 wherein the means for placing the selected one or more first optical channels and the selected one or more second optical channels onto the first optical path includes an optical circulator.

14. A bidirectional optical network as recited in claim 7 wherein the means for placing the selected one or more third optical channels and the selected one or more fourth optical channels onto the first optical path includes an optical circulator.

* * * * *